UNITED STATES PATENT OFFICE.

CARLETON ELLIS, OF MONTCLAIR, NEW JERSEY.

PROCESS OF TREATING OILY MATERIALS.

1,247,516.   Specification of Letters Patent.   Patented Nov. 20, 1917.

No Drawing.   Application filed March 15, 1915. Serial No. 14,524.

*To all whom it may concern:*

Be it known that I, CARLETON ELLIS, a citizen of the United States, and a resident of Montclair, in the county of Essex and State of New Jersey, have invented certain new and useful Improvements in Processes of Treating Oily Materials, of which the following is a specification.

This invention relates to the catalytic hydrogenation of oil and relates particularly to the hydrogenation or hardening of fatty oils normally so constituted as to largely inhibit the effective action of the catalyzer in the hydrogenation operation, and further relates to the hydrogenation of marine animal oils, including fish, whale and cod oil and to the products of such treatment.

Many oils contain traces of sulfur, phosphorus, arsenic, cyanid derivatives, chlorin, iodin and other bodies more or less toxic to certain types of catalyzers, which toxic bodies are oftentimes present in oils and fats in such minute traces as to be scarcely detected by analysis, yet being present in an amount sufficient to inhibit or utterly destroy the activity of catalytic bodies. Ordinary refining processes do not usually remove these toxic bodies in a satisfactory manner, although in some cases a fairly complete removal is secured, but oftentimes the refining process conducted as it usually is to remove coloring matter and albumins, not only does not throw down all the catalyzer toxins, but sometimes even introduces traces of chlorin or other undesirable bodies.

The traces of catalyzer poisons cause much trouble and loss in hydrogenation, not only by reducing the life of the catalyzer but by making its activity so uncertain that the output of a plant may vary from day to day and cause much perplexity and annoyance because of the uncertainty of the operation.

My invention has to do with the elimination of these bodies or partial or complete reduction of their action and in the preferred form it involves the treatment of the oil or fat with a metallic body or metalliferous compound capable of reacting with or absorbing a part or whole of the poison, so that by filtration the oil may be more or less freed from traces of toxic bodies.

In carrying out this step I may add to the material to be detoxicated a metal such as aluminum, nickel, iron, copper, zinc and the like or their oxids or suboxids or their hydrates or other metalliferous material preferably in a finely divided or colloidal form, preferably heating the oil and stirring or grinding same with the detoxicator, as the toxin remover or eliminator may be termed, until the desired combination or occlusion of the poison has occurred. The oil may then be filtered to remove the detoxicator and accumulated poison, catalyzer added to the oil and hydrogen or hydrogen-containing gas passed into the oil until the latter has been hardened to the desired consistency. The temperature, pressure of the gas and the like are to be regulated with reference to the nature of the oil treated and the catalyzer employed in the manner well known in the art.

From say one to five per cent. or so of the detoxicator may be used, the proportion to be regulated by the character of the oil. When the latter is strongly acid through the presence of fatty acids, soaps may form which dissolve in the oil and these may be decomposed by boiling with aqueous mineral acids such as hydrochloric acid.

The temperature may be regulated under ordinary conditions of operation as the detoxicating action or reaction usually is facilitated by the application of heat, temperatures between 100 and 250° C. being the most desirable range, and 170–190° C. usually being the desirable limits with heavy metal detoxicators, especially when neutral oil is being treated. When the oil is rather highly acid lower temperatures are often preferable.

The metal detoxicator should, as stated, be in a finely divided condition as it is important to secure a very large surface for exposure to so viscous a liquid as an oil, especially when it is necessary to remove such minute traces. A fine or extended condition of the metal or other detoxicator is, moreover, important and it is also desirable to bring the finely divided material into thorough contact with the oil as by stirring forcibly, or by grinding or other similar treatment.

Oxids, hydrates, carbonates and the like may be reduced by heating in the presence of hydrogen, water gas, hydrocarbon vapors and the like and thus the metal is obtained in a very finely divided condition. Fullers' earth and pumice ground to fine dust may be treated, or in the case of the latter, impregnated with a solution of the metal and the reduction then caused to take place, thus spreading and extending the detoxicator to a desirable degree.

The mixture of the metal and its oxids or other compounds may be used, or of one metal with the oxid of another metal or two metals may be mixed as, for example, copper and aluminum. The catalyzer which is spent, that is to say, has lost its efficiency as a catalytic agent in oil hardening processes, may be used as a toxin absorbing or occluding agent as it is yet effective for such purposes after its catalytic properties are lost. This is especially true of a catalyzer which has been injured by oxidation rather than by toxic action, such oxidation perhaps occurring through the presence of oxygen in the hydrogen gas used for the oil hardening operation.

In the case of oils which are heavily charged with alubumin and mucins, treatment with one-half of one per cent. of formaldehyde gas or solution is desirable before detoxication in accordance with the foregoing.

Treatment of the oil with the fine particles of material or other detoxicating material suspended in oil by vigorous stirring, etc., and maintained under proper thermal conditions gives a rapidity of treatment and thoroughness of detoxication which is not readily secured by filtering through a porous bed of detoxicator or by attaching the latter as a coating to paddles or vanes which are revolved in the oil to be treated. It appears that the peculiar action of detoxicator to be wholly effective requires a material in a very fine state of division in order to accomplish highly satisfactory results with a body of the viscosity of oils and fats.

Where the terms oil and fat are used throughout this specification they are synonymous and the terms detoxicator and detoxication refer respectively to materials capable of removing small or minute quantities of toxic materials and to the process of such removal.

According to the present process the treatment of the oil may if desired progress in two stages. In the first stage thereof the oil is entirely or substantially freed from inhibitors of catalysis and in the second stage the oil is subjected to treatment with hydrogen in the presence of a catalyzer. The treatment of the oil in the first stage should be carried out with respect to the second stage of the operation so that the catalytic material employed may be used effectively, that is to say, the first stage operation should be conducted with respect to the specific qualities and susceptibilities of the particular catalyzer employed. The removal of free fatty acids may be effected in a large measure by treating the oil with superheated steam while agitating under reduced atmospheric pressure. When however, the oil contains resins and other bodies which cannot be readily removed by distillation the oil may be subjected to treatment with alkali to form a soap with the fatty acids and acid resins, which soap being of a colloidal character absorbs from the oils various undesirable bodies which have an inhibiting action on catalyzers. The soap is removed by settling and the resulting more or less nearly neutral oil is treated with a finely divided detoxicator and is subjected to the second stage which may be carried out illustratively as follows: A quantity of nickel hydrate or carbonate is heated with a small quantity of the oil to about 260° C., while hydrogen or other reducing gas is passed through and when the nickel material has been sufficiently reduced it is added to about twenty times its weight of the oil from the first stage of the operation. The temperature is maintained at 180 to 200° C., and hydrogen is passed through the oil while the catalyzer is maintained in a state of agitation by the passage of the gas through the oil, or if desired by mechanical stirring. The temperature may be reduced below this if desired, as for example between 150 to 170° C. By proceeding in this manner after a short space of time the oil is hardened to a consistent fat as hard as or harder than tallow or stearin.

As a more specific illustration of the method, a grade of cod oil having an acid number of about 25 and a percentage content reckoned as oleic acid of one-half this number or 12%, was treated with an amount of caustic soda or ammonia in aqueous solution, sufficient to unite with the fatty acids.

The alkali and oil were agitated at 65 to 75° C. for a short time and the soap allowed to settle. The oil was then washed with water and agitated for one hour at 180° C. with 5% of freshly precipitated copper hydrate. The latter was then allowed to settle and was filtered off. A small amount of copper remained in solution in the oil, or in a colloidal condition. A suitable quantity of the nickel material as above indicated was added, and the oil was then treated with hydrogen. In a few hours the oil readily hardened to a fat melting at 53° C. The small amount of copper remaining in the oil during the hydrogenation step was largely removed with the catalyzer, on final filtration.

Another sample of this same oil, treated without the detoxicating step for several days with hydrogen in the presence of a nickel catalyst, showed no visible hardening.

In the manufacture of oils intended for edible purposes it is customary to wash out free acid with alkali as a small amount of free acid gives the product an undesirable rancid flavor or the changes which develop acidity are generally accompanied by that change in flavor recognized as rancidity. Crude oils intended for edible purposes should have a relatively small content of free fatty acid. For example in the case of cottonseed oil the crude oil which is to be used for edible purposes should contain only a few per cent. of free fatty acid. If larger amounts are present the oil is generally regarded as undesirable for preparing edible products and the oil is used for soap making or other industrial purposes, where the presence of larger amounts of free fatty acid is of less importance. In the case of soap fat the presence of fatty acid is of no disadvantage and in fact is an aid in saponification. Therefore, with low grade oils such as the marine animal oils mentioned which supposedly were not adapted for edible purposes, in making use of these in the inedible field no attention for the purposes hereof has been paid to the presence of free fatty acid. In making soap, as stated, the presence of free fatty acid is not objectionable. Attempts to harden these oils for industrial purposes have been directed toward the treatment of the crude or slightly clarified oil, without successful results as indicated. The teachings from various publications have led workers in the hydrogenation field to assume that oleic acid was as readily hydrogenated as a neutral glycerid. In consequence the removal of free fatty acid and other inhibitors of hydrogenation by the procedure here illustratively set forth above has not been practised to my knowledge.

When it is desired to remove glycerin from a highly acid oil, at the same time converting the unsaturated into saturated bodies, the fatty acid may be removed as indicated, the oil hydrogenated, and the product saponified by the autoclave process or otherwise and the glycerid thus obtained.

The removal of the fatty acid also enables hydrogenation to be carried out with catalyzers of the nickel oxid type without objectionable solution of the nickel in the oil, so that products adapted for edible purposes may be obtained without any toxic quantities of nickel.

The process may be carried out with various oils of the character mentioned and the hardened product may subsequently if desired be further deodorized by treating with steam under reduced atmospheric pressure. Various catalyzers such as finely divided nickel on a suitable supporting material, palladium, osmium, and the like or suitable compounds of these may be employed as catalytic material. The temperature of hydrogenation may be varied within quite wide limits, generally speaking a very moderate temperature is sufficient for the purpose and yields an oil of a desirable color and flavor. On the other hand when higher temperatures are employed, carbonization and blackening do not occur.

Hydrogen or a hydrogen-containing gas may be used at ordinary pressure or at higher pressures if desired.

The removal of any resinous inhibitors of catalysis may be effected by treatment of the oil with caustic soda or potash. Or milk of lime may be employed for this purpose to produce a lime soap which effectively removes the last traces of the undesirable resin-like bodies. This may be carried out by combining the major portion of the free fatty acid with soda or potash and then adding a quantity of lime sufficient to combine with the remaining fatty acid so as to more effectively occlude the resinous material. Or the soda soap may be settled and removed and lime added to afford the final treatment. Other alkaline earths such as barium hydroxid may also be employed. The removal of the entire amount of fatty acid or such part of it as is required may be carried out with carbonated alkali or caustic alkali.

The interrelation which exists between the stage of removal of the inhibitors of catalysis and the hydrogenation stage establishes a correlation between the two stages which constitutes a homeogeneous process.

While spent nickel catalyzer may be used for detoxicating oil in some instances, in other cases nickel material which has been reduced by hydrogen or otherwise subjected to rather high temperatures does not appear to be in the right condition for absorbing catalyzer poisons to the extent desired. Copper is particularly serviceable especially when used in a form of freshly precipitated copper hydrate. The ordinary commercial form of copper carbonate I have not found so effective in this connection. Copper is especially desirable in the treatment of inedible fats, while other detoxicating agents may be used for the preparation of edible products although copper is likewise suitable for this purpose provided it is substantially or entirely eliminated from the final product.

In treating the oil with copper hydrate under agitation while exposing the oil to the air at the temperature employed some discoloration of the fatty material is liable to occur and it is better to carry on this operation substantially out of contact with the air or in the presence of inert gas. If desired, hydrogen may be passed through the oil and copper or kept in contact with the former and during the detoxicating operation. Hydrogen is also advantageous under these conditions as it tends to prevent any material solution of the copper in the oil, aside from any slight hydrogenation which may take place under these conditions.

From menhaden or cod oils a substantially neutral product may be obtained which has a hardness ranging from lard or tallow to brittle products of high melting point. So far as I am advised it has not been heretofore possible to prepare these desirable hard brittle products by the hydrogenation of marine animal oils. Products useful in stuffing harness leather or other leather material may be prepared from menhaden or cod oil by hydrogenating to a melting point of about 125° F. (The Farenheit scale is used in this connection because of the practice in the leather trade of expressing the melting point of leather stuffing on this scale.) Animal fats such as stearin having a fatty acid content of more than 2% are liable to spew or cause a bloom on the leather and are regarded as objectionable for the purpose aforesaid. By the present process the acidity of the oil may be reduced to below 2% or even to form a neutral oil and the product hardened to 125° F. affording a fatty material which is of utility in the leather trade. The removal of sulfur also is desirable.

The treatment of oils in a liquid state with finely divided detoxicating material with the ability to hydrogenate the product as a liquid fat obviates the difficulties heretofore experienced through attempting to volatilize fatty material and pass over catalyzer for the purpose of hardening the fatty material. While it is possible to volatilize a fatty acid, glycerids cannot be so treated without marked decomposition. The present process enables fats to be handled in a liquid state to produce useful commercial products. Thus low grade oils which have heretofore been regarded as incapable of hydrogenation are now made useful in the arts.

The soap obtained by the neutralization of free fatty acid may be treated with sulfuric acid to liberate the fatty acid and these sulfonated to form sulfonated oil material suitable for textile purposes or in the leather industry. In the latter field the sulfonated cod oil or other fish oil is in demand and consequently the entire fatty material taken in the present process may be utilized to good advantage.

Edible products may be prepared from the hydrogenated cod or menhaden oil or other similar marine animal oil, more particularly by incorporating such hardened product with an oil such as good quality cottonseed oil. Lard substitute may be prepared by melting 10 to 15 parts of highly hydrogenated cod oil of a neutral character and incorporating with 90 to 85 parts of cottonseed oil. The product is preferably chilled to cause a quick set.

The detoxicating agent enables the removal of sulfur or iodin or similar disturbing element which may be objectionable in edible fats. By the removal of sulfur there is less tendency to the formation of sulfureted or other sulfur compound. In a similar manner by the removal of iodin the objection to the presence of iodin in edible fats of everyday consumption is eliminated. The proportion of hardened cod oil or other hardened fish or whale oil to cottonseed oil may be varied or other vegetable oils such as corn oil and the like may be similarly employed. Fish oil and cottonseed oil may be co-hydrogenated.

To recapitulate, my invention is concerned with or involves treating in a liquid condition oils and fats containing catalyzer poisons, often present only as traces, which treatment comprises adding to the oil or fat a detoxicating material preferably a finely divided or pulverulent material or metalliferous or oxid or hydroxid material (such as basic copper material preferably copper hydrate) having an affinity for said poisons, but preferably substantially without other effect or action on the oil or fat, preferably suspending the detoxicator in the oily medium as by rapid stirring, preferably heating, usually between 100 and 200° C. and continuing such conditions until the poison is absorbed by the detoxicator to the degree desired or necessary, then if desired introducing active catalytic material and hydrogen so as to harden the oil to the required consistency, the detoxicator preferably being removed before the addition of the active catalytic material. By such procedure a neutral hardened fat may be obtained from strongly acid menhaden and cod or other fish oil, whale oil and blubber or body oils from marine animals.

What I claim is:

1. The process of treating fatty material such as animal and vegetable oils which comprises adding thereto a finely-divided detoxicating material comprising copper hydrate, heating and stirring, filtering and adding active catalyzer to the fatty material and thereupon hydrogenating the latter.

2. The process of treating fish oil and similar fatty material which comprises adding thereto a finely divided material capable of absorbing catalyzer poisons comprising copper hydrate, in intimately contacting the finely-divided material with the oil under suitable thermal conditions and in subsequently freeing the fatty material from the finely-divided material; whereby the said fatty material is sufficiently freed from destructive catalyzer poisons.

3. In the process of hydrogenating fatty material and the like the improvement which comprises incorporating therewith, a finely divided basic compound of a metal, which compound is capable of combining with any sulfur-containing substances which could have a harmful effect upon a nickel catalyst, whereby such sulfur-containing substances are converted into insoluble bodies, and thereafter intimately contacting the material with the finely-divided body under suitable thermal conditions and in subsequently removing the finely-divided body.

4. The process of treating oil which comprises the step of exposing an oil containing catalyzer poisons to the action of a basic copper-containing compound capable of detoxicating the said oil.

5. In the process of hydrogenating oil, the step which comprises exposing an oil containing bodies tending to poison nickel catalyzer to the action of a finely-divided copper body capable of detoxicating said oil, in subsequently substantially removing the copper material and absorbed nickel poisons and in subjecting the detoxicated oil to the action of hydrogen and nickel catalyzer.

6. The process of treating oil which comprises the step of exposing an oil containing catalyzer poisons to the action of copper hydrate, in vigorously stirring the oil to be detoxicated, in maintaining suitable thermal conditions during such stage and in thereupon eliminating the copper hydrate with more or less catalyzer poisons combined or occluded therewith; whereby the oil becomes fitted for normal catalytic hydrogenation.

7. The process of hydrogenating fish and whale oils having a relatively high acid content and which are not capable of being readily hydrogenated by the action of hydrogen in the presence of a nickel catalyzer, which comprises treating said oil with copper-containing bodies capable of substantially removing from such oil the constituents inhibiting catalysis so that the resulting oil will readily hydrogenate when subjected to the action of hydrogen in the presence of a catalyzer.

8. The process of detoxicating fish and whale oils containing sulfur and which are not capable of being readily hydrogenated by the action of hydrogen in the presence of a nickel catalyzer, which comprises heating the oil with a basic compound of copper capable of removing the sulphur.

9. The process of detoxicating oils containing sulfur and which are not capable of being readily hydrogenated by the action of hydrogen in the presence of a nickel catalyzer, which comprises heating such oil with an amount of copper hydrate sufficient to substantially completely remove the inhibitors of catalysis so that the resulting oil will hydrogenate when subjected to the action of hydrogen in the presence of nickel catalyzer.

10. In the process of hardening fatty material such as animal or vegetable oils with the aid of nickel catalyzer the step which comprises adding to the oil in a liquid state a finely-divided basic copper-containing substance capable specifically of removing poisons from the oil which inhibit the action of nickel catalyzers.

11. In the catalytic hydrogenation of oils, the step prior to the treatment with hydrogen, which comprises subjecting an oil containing chlorin and sulfur impurities capable of acting as catalyzer poisons, to the action of a copper-containing detoxicating agent capable of removing said chlorin and sulfur impurities, while maintaining said oil in a liquid state.

12. The process of treating fatty material such as animal or vegetable oils which comprises adding to the oil in a liquid state finely-divided copper hydrate capable of removing catalyzer poisons from the oil and in subsequently subjecting the oil to the action of hydrogen in the presence of a nickel catalyzer.

13. In the process of treating fatty material, the herein described improvement which comprises hydrogenating with a nickel catalyzer an oil containing dissolved copper and in subsequently substantially freeing the oil from traces of nickel and copper.

14. The process of treating oils comprising treating fatty oil with a basic compound of a metal which compound is capable of detoxicating said oil and thereafter hydrogenating the detoxicated oil in the presence of a hydrogenating catalyzer.

15. In the treatment of oily materials containing unsaturated bodies and also containing impurities capable of acting as catalyzer poisons, the step of adding to such oils, a basic compound of a metal which compound is capable of reacting with such impurities to form oil-insoluble bodies, and thereafter removing at least the major portion of such oil insoluble bodies; thereafter adding a hydrogenating catalyst and passing hydrogen in contact with said oil.

16. A process which comprises adding to a fatty oil containing unsaturated components and materials inimical to catalytic hydrogenation of such components, a basic compound of a metal, which compound is free from active substances capable of exerting a poisoning effect upon such catalytic hydrogenation, removing at least a portion of the products of such treatment from the oil, and thereafter subjecting the oil to the action of hydrogen in the presence of a catalyst capable of effecting hydrogenation.

Signed at Montclair, in the county of Essex and State of New Jersey, this 12th day of March, A. D. 1915.

CARLETON ELLIS.

Witnesses:
W. O. HENKE,
A. A. WELLS.